UNITED STATES PATENT OFFICE.

VICTOR CLAIREMONT AND CHRISTIAN T. LEHMANN, OF SAN FRANCISCO, CALIFORNIA.

EGG-PRESERVATIVE.

1,388,024.   Specification of Letters Patent.   Patented Aug. 16, 1921.

No Drawing.   Application filed October 29, 1919. Serial No. 334,255.

*To all whom it may concern:*

Be it known that we, VICTOR CLAIREMONT and CHRISTIAN T. LEHMANN, citizens of the United States, and residents of San Francisco, in the county of San Francisco and State of California, have invented new and useful Improvements in Egg-Preservative, of which the following is a specification.

The object of the present invention is to provide an improved method of preserving eggs and an improved composition for use in said method, which will be very effective in preserving eggs and will require little labor or care in its use by farmers and poultrymen.

In forming our improved composition, we dissolve in a mineral preferably an odorless and tasteless light mineral oil, such as ameroil, standelac, acto, or what is known as Russian mineral oil, solid paraffin and rosin or pine pitch.

The proportions in which we use these ingredients are preferably; one gallon of light mineral oil, one ounce of pine pitch and two ounces of solid paraffin. In order to dissolve the solid ingredients, the mixture is brought to the boiling point and then allowed to cool. This solution is intended to be used cold, but if the eggs are dipped in the solution while hot, then less of the solid ingredients need be used.

The pine pitch seems to act in the composition as a germicide, the paraffin as a closure for the pores of the shell, and the mineral oil as a medium for introducing paraffin and pine pitch into the pores of the shells of the eggs.

The pine pitch is used in a comparatively small amount in order to avoid imparting a taste to the egg, but, even if used in this small amount, it is found to be effective in killing the germs in the shell of the egg. It also appears to assist the paraffin in forming a closure for the pores of the shell.

In Patent No. 1,092,897, Victor Clairemont disclosed a process of preserving and sterilizing eggs by subjecting the eggs to a temperature higher than that of boiling water for a short period of time and applying a thin coating to the outside of the shell while in a heated condition. By this process, the germs were effectively killed, but it was open to the objection that, when the eggs were afterward subjected to a temperature above 70° F., the pores of the shell then became open, admitting germs to the interior of the shell, but not through the skin of the egg, with the result that the outer side of the skin became spotted with black spots in from one to two eggs in a case, and eggs so spotted were rejected as unsalable, although the meat of the egg was perfect. The coating of the shell was not of such a character as to preserve the shell closed when the egg was subjected to temperatures of 70° or higher.

We have found that by treating by the present process, the shell becomes coated with a coating filling the pores of the shell, which remains solid and seals said pores at ordinary temperatures, so that the pores will not open up in hot weather and no such black spots occur in the shell and in the skin of the eggs.

We find that the heavy mineral oils, such as liquid petrolatum or nujol, are inferior media to carry out our improved process. The reason appears to be that they are too heavy and dense in character to penetrate the pores sufficiently to carry therewith the paraffin and rosin in solution therein.

If solid paraffin alone were dissolved in the light mineral oil, and the liquid adhered thereto, the eggs would be covered with a soft coating which would be liable to stick to the fillers or flats used in candling the eggs. If rosin were used alone in conjunction with light mineral oil, the eggs would present a varnished appearance and would also stick to the fillers and flats. The mixture of paraffin and rosin dissolved in the light mineral oil seems to be effective in producing a perfect invisible coating in which the rosin helps the paraffin to harden and the paraffin reduces the glaze-like appearance of the rosin.

The advantage of this process and composition is that the farmer and poultryman can treat eggs simply by dipping them in the composition for from ten seconds to an hour, but not longer than an hour, for, otherwise, the solution would penetrate the skin of the egg, with the result that, when the egg was afterward boiled, the meat of the egg would stick to the skin and shell. If dipped in a solution for a period between ten seconds and an hour, the egg will remain perfectly fresh for an indefinite period and when used, will have the quality of a fresh egg.

We have found that if the solution be kept for a long time, it is not so effective as when fresh. Its effectiveness, however, is restored by dissolving more paraffin in it, sufficient to lighten the oil in color.

Thus, if the solution is not to be wholly used for a year, it is necessary to put in as much paraffin as possible without the solution becoming thick with paraffin.

The cold process is only applicable to eggs which are comparatively fresh, and, for eggs which are two or three weeks old, it is desirable to apply the solution to the eggs at 240° F. or thereabout. Now, if this solution be applied hot to eggs, a great number of times, it is found that it becomes ineffective for treating the eggs, owing to a deficiency of paraffin and paraffin must be restored to the solution to correct this deficiency. Thus if the liquid be used in the proportion specified, that is to say, two ounces of paraffin to one gallon of oil, and heat is used in the process to sterilize comparatively old eggs, then for every ten hours of heat used, one-half ounce of paraffin should be added to the liquid.

For the above reason, it appears that the paraffin is effective in closing the pores.

We claim:

A composition for treating eggs which comprises a light mineral oil of the Russian variety, paraffin which has been dissolved in oil and rosin, in the proportions such that the oil acts as a medium for introducing paraffin and rosin into the pores of the shells of eggs, the rosin aids the paraffin in hardening and remaining solid as a thin hard coating without embodying a rosin taste to the eggs, the rosin also acts as a germicide and the paraffin reduces the glaze-like appearance of the rosin.

VICTOR CLAIREMONT.
CHRISTIAN T. LEHMANN.